(12) United States Patent
Ware

(10) Patent No.: US 12,645,632 B2
(45) Date of Patent: *Jun. 2, 2026

(54) MEMORY SYSTEM WITH INDEPENDENTLY ADJUSTABLE CORE AND INTERFACE DATA RATES

(71) Applicant: Rambus Inc., San Jose, CA (US)

(72) Inventor: Frederick A Ware, Los Altos Hills, CA (US)

(73) Assignee: Rambus Inc., San Jose, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/657,566

(22) Filed: May 7, 2024

(65) Prior Publication Data

US 2024/0394209 A1 Nov. 28, 2024

Related U.S. Application Data

(63) Continuation of application No. 17/715,399, filed on Apr. 7, 2022, now Pat. No. 11,983,137, which is a continuation of application No. 16/874,439, filed on May 14, 2020, now Pat. No. 11,314,681, which is a continuation of application No. 15/626,038, filed on Jun. 16, 2017, now Pat. No. 10,671,561, which is a continuation of application No. 13/421,623, filed on Mar. 15, 2012, now Pat. No. 9,684,623.

(60) Provisional application No. 61/453,883, filed on Mar. 17, 2011.

(51) Int. Cl.
*G06F 13/42* (2006.01)

(52) U.S. Cl.
CPC .......... *G06F 13/4234* (2013.01); *Y02D 10/00* (2018.01)

(58) Field of Classification Search
CPC .................................................. G06F 9/30036
See application file for complete search history.

(56) References Cited

U.S. PATENT DOCUMENTS

| | | | | |
|---|---|---|---|---|
| 5,896,404 | A | * | 4/1999 | Kellogg ............... G11C 7/1018 |
| | | | | 714/766 |
| 5,973,628 | A | | 10/1999 | McDonnell et al. |
| 5,982,309 | A | | 11/1999 | Xi et al. |
| 6,271,682 | B1 | | 8/2001 | Lindsay |
| 7,515,453 | B2 | | 4/2009 | Rajan |
| 7,529,149 | B2 | | 5/2009 | Pyeon et al. |
| 8,595,597 | B2 | | 11/2013 | Xie et al. |
| 2013/0117495 | A1 | * | 5/2013 | Rajan .................. G06F 12/0238 |
| | | | | 711/102 |

* cited by examiner

*Primary Examiner* — Henry Tsai
*Assistant Examiner* — Juanito C Borromeo
(74) *Attorney, Agent, or Firm* — Lance Kreisman; Peninsula Patent Group

(57) ABSTRACT

An integrated circuit device is disclosed including core circuitry and interface circuitry. The core circuitry outputs in parallel a set of data bits, while the interface circuitry couples to the core circuitry. The interface circuitry receives in parallel a first number of data bits among the set of data bits from the core circuitry and outputs in parallel a second number of data bits. The ratio of the first number to the second number is a non-power-of-2 value.

20 Claims, 14 Drawing Sheets

MEMORY SYSTEM WITH INDEPENDENTLY ADJUSTABLE CORE AND INTERFACE DATA RATES

CROSS-REFERENCE TO RELATED APPLICATIONS

This application is a Continuation of U.S. patent Ser. No. 17/715,399, filed Apr. 7, 2022, titled MEMORY SYSTEM WITH INDEPENDENTLY ADJUSTABLE CORE AND INTERFACE DATA RATES, which is a Continuation of U.S. patent Ser. No. 16/874,439, filed May 14, 2020, titled MEMORY SYSTEM WITH INDEPENDENTLY ADJUST-ABLE CORE AND INTERFACE DATA RATES, now U.S. Pat. No. 11,314,681, which is a Continuation of U.S. patent Ser. No. 15/626,038, filed Jun. 16, 2017, titled MEMORY SYSTEM WITH INDEPENDENTLY ADJUSTABLE CORE AND INTERFACE DATA RATES, now U.S. Pat. No. 10,671,561, which is a Continuation of U.S. patent Ser. No. 13/421,623, filed Mar. 15, 2012, titled MEMORY SYSTEM WITH INDEPENDENTLY ADJUSTABLE CORE AND INTERFACE DATA RATES, now U.S. Pat. No. 9,684,623, which claims the benefit of priority under 35 U.S.C. § 119 (e) to Provisional Application Ser. No. 61/453,883, filed Mar. 17, 2011, titled MEMORY SYSTEM WITH INDEPENDENTLY ADJUSTABLE CORE AND INTER-FACE DATA RATES, all of which are incorporated herein by reference in their entirety.

TECHNICAL FIELD

The disclosure herein relates to semiconductor memory systems, and more particularly to semiconductor memory systems employing independently adjustable core and inter-face data rates.

BACKGROUND

Memory system designers often consider a variety of criteria in determining an optimum design for a given memory application. For example, system bandwidth is often constrained by allowable pin counts (interface widths) and achievable link data rates.

Total system bandwidth is often expressed in terms of an interface width N (representing the number of links that connect a memory controller to a memory device) multiplied by individual link rate R (representing a number of bits transferred per second over a link). Designers sometimes achieve a desired total bandwidth in different configurations for a given system architecture by, for example, halving widths and correspondingly doubling link data rates and vice-versa. This corresponds to a ratio between available core I/O paths (on the order of a power-of-two value in the thousands) and the designed number of interface links. The ratio generally corresponds to a power-of-two integer ($2^N$) value because of the binary nature of integrated circuit devices.

While implementing power-of-two relationships in pin counts and link data rates can be straightforward, practical application of this formula is limited by signal integrity issues associated with high-volume and low-cost packaging interconnects. In other words, simply doubling a data rate while halving the number of interface links may not be possible without new and costly packaging technologies.

Thus, the need exists for a way to provide designers with the ability to independently configure core and interface data rates for memory system integrated circuit devices.

BRIEF DESCRIPTION OF THE DRAWINGS

Embodiments of the disclosure are illustrated by way of example, and not by way of limitation, in the figures of the accompanying drawings and in which like reference numer-als refer to similar elements and in which:

FIG. 2C illustrates a close-up portion of the architecture of FIG. 2A, similar to FIG. 2B, including circuitry to carry out a power-of-two mode of operation;

FIG. 5 illustrates an operational timing diagram of the system of FIG. 2;

FIG. 10 illustrates a further embodiment of the distribu-tion logic of FIG. 6 in further detail;

FIG. 11 illustrates a timing diagram corresponding to the operation of the distribution logic of FIG. 10; and FIG. 12 illustrates one embodiment of a multi-chip sys-tem employing one or more of the embodiments described herein.

DETAILED DESCRIPTION

Embodiments of memory systems, devices and methods are disclosed herein. One embodiment of a semiconductor memory device comprises an integrated circuit device including core circuitry and interface circuitry. The core circuitry outputs in parallel a set of data bits, while the interface circuitry couples to the core circuitry. The interface circuitry receives in parallel a first number of data bits among the set of data bits from the core circuitry and outputs in parallel a second number of data bits. The ratio of the first number to the second number is a non-power-of-2 value. By enabling the ratio to be a non-power-of-2 value, significant flexibility in balancing device pin counts versus link data rates may be realized, providing optimal device packaging and operation for a variety of applications.

In a further embodiment, a method of operation in an integrated circuit is disclosed. The method comprises receiv-ing a memory access command; transferring in parallel a first number of data bits between core circuitry and interface circuitry in response to the received command; and trans-ferring in parallel a second number of data bits between the interface circuitry and a set of data pins, wherein the ratio of the first number to the second number is a non-power-of-2 value.

In yet another embodiment, a clock circuit is disclosed. The clock circuit includes a bit-rate clock input to receive a bit rate clock signal at a bit rate frequency and a state machine. The state machine includes a counter and a state decoder. The counter is responsive to the bit rate clock to generate a plurality of state signals. The state decoder is coupled to the counter to generate actions based on predetermined subsets of the plurality of states, such that a first clock signal at a first frequency is generated in response to a first subset of the plurality of state signals, and a second clock signal at a second frequency is generated in response to a second subset of the plurality of state signals.

Figure 1:
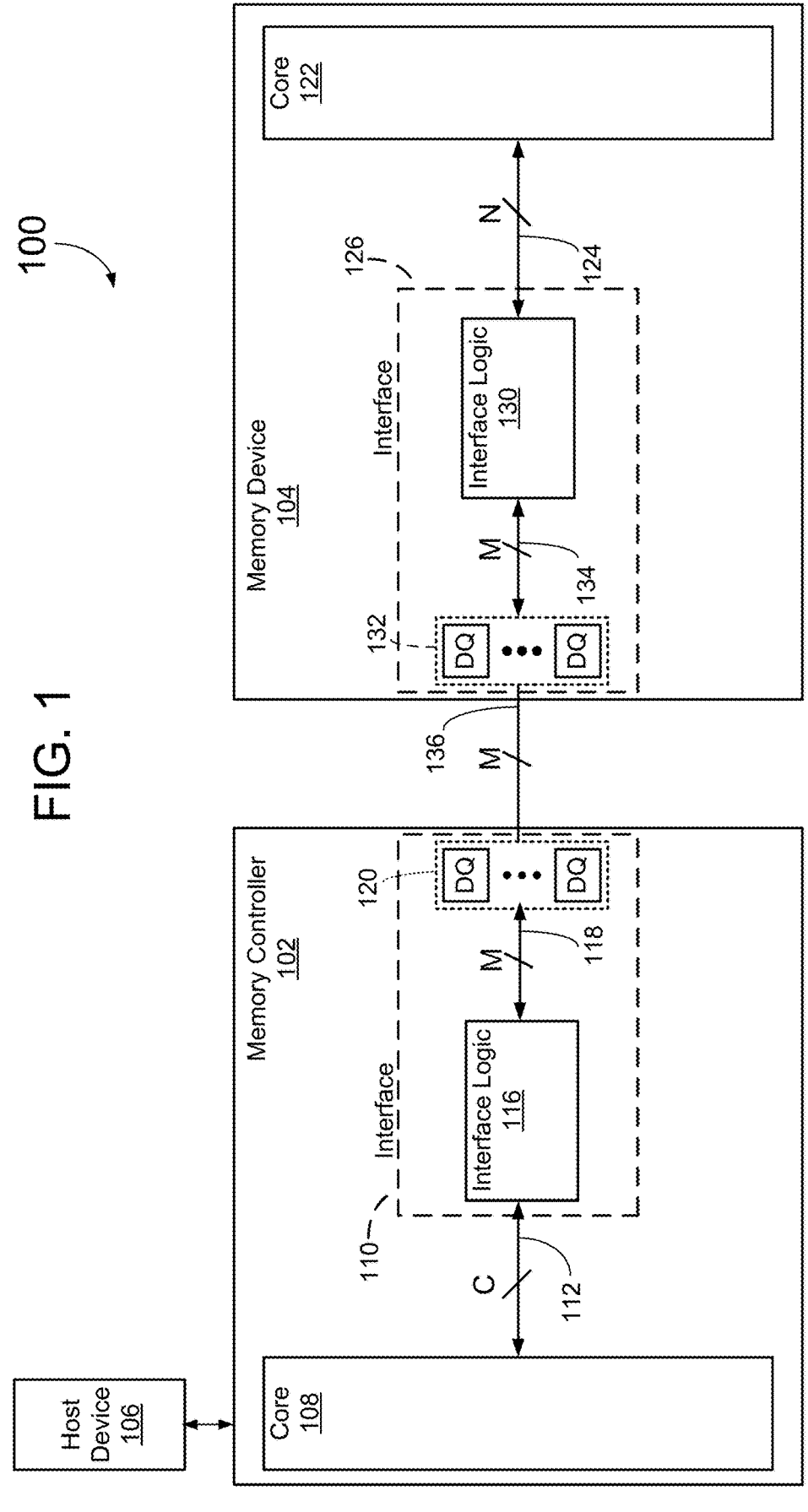
FIG. 1 illustrates a memory system according to an embodiment.

FIG. 1 illustrates a semiconductor memory system, generally designated 100, that employs a first integrated circuit (IC) device 102 that in one embodiment takes on the form of a semiconductor memory controller for controlling memory operations associated with a second IC device 104. In one embodiment, the second IC device takes on the form of a semiconductor memory device, such as a DRAM or flash memory device. The memory controller 102 may interface with a host device 106, which operates in accordance with an application protocol to store and retrieve data to and from the memory system 100.

Further referring to FIG. 1, the memory controller 102 generally includes logic core circuitry 108 responsive to instructions from the host device 106. An interface 110 couples to the core circuitry via a number of "C" core input/output (I/O) paths 112. The interface 110 includes interface logic 116 and pin interface 120. The interface logic, as more fully described below, manages in-flight memory read and write operations. A set of "M" interface paths 118 couple the interface logic 116 to a corresponding number of "M" I/O pins or pads that form the pin interface 120. The I/O pads may also include various address, control and clock pads, but for purposes of clarity are not illustrated in FIG. 1.

While the memory controller 102 is illustrated in FIG. 1 as a discrete integrated circuit separate from the host device 106, in some embodiments, the memory controller 102 may include or reside in the host device 106. In some embodiments, the controller 102 may reside in a common package with the memory device 104, such as in a multi-chip package (MCP) or system-in-package (SIP) configuration.

With continued reference to FIG. 1, the IC memory device 104 may take on a similar general architecture to that of the memory controller 102, with a memory core 122 accessed via a number of "N" I/O paths 124. A memory interface 126 couples to the memory core via the "N" I/O paths, and includes interface logic 130 and an I/O pin interface 132. The interface logic 130 manages in-flight read and write memory operations. The interface logic 130 connects to the I/O pin interface 132 through a corresponding number of "M" interface paths 134. The memory device pin set 132 interfaces with the memory controller pin set 120 through a number of "M" links 136.

In one embodiment, the memory interface logic 130 spatially distributes read data such that a ratio between the number of "N" core I/O paths and the number of "M" links results in a non-power-of-two value. FIGS. 2-5 illustrate such an embodiment. In a further embodiment, the memory interface logic temporally distributes read data to achieve the non-power-of-two ratio. FIGS. 6-11 illustrate an embodiment consistent with this notion. While the following disclosure details an explanation primarily relating to read data operations, this is merely for purposes of conciseness, with write operations involving structures and steps similar to those involving read operations, but in an inverse manner. Of course, various features disclosed in the context of each embodiment may be employed in one or more other embodiments described herein.

Further referring to FIG. 1, in one embodiment, read operations at a very high level generally involve accessing the memory device core 122 with a subset of the "N" I/O paths, resulting in a first number "X" of data bits output from the core in parallel along the subset of paths. The memory interface circuitry 126 receives the set of parallel bits and generates a second number "Y" of data bits for output in parallel on a subset of the "M" interface paths to the pin interface 132. The sets of bits are such that the ratio of the first number "X" of parallel bits to the second number "Y" results in a non-power-of-2 value. The links 136 transport the data to the memory controller pin interface 120, and subsequently feed the data to the interface logic 116 and on to the controller core circuitry 108. Write operations are handled in a similar manner, but resulting in data being stored in the memory device core 122 rather than being retrieved from it. The controller and memory device include circuitry to essentially swap roles as described above (such that, for example, the controller spatially distributes and serializes write data for transmission to the memory device, which then deserializes and re-distributes appropriately). This configurability for enabling non-power-of-2 ratios provides memory system designers with improved flexibility in balancing pin counts with link data rates to optimize overall memory system designs.

Figure 2A:
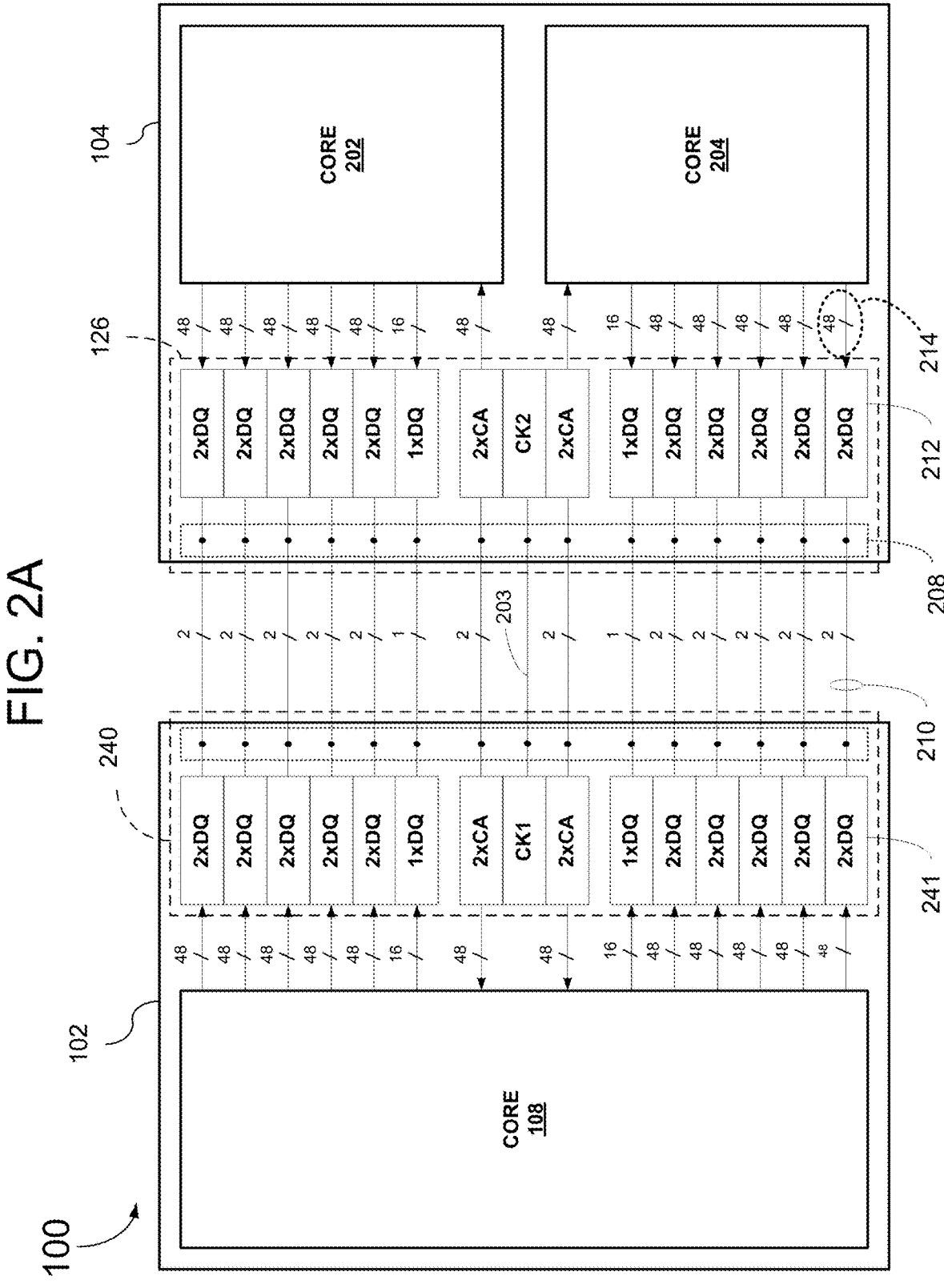
FIG. 2A illustrates the memory system of FIG. 1 in further detail.
Figure 2B:
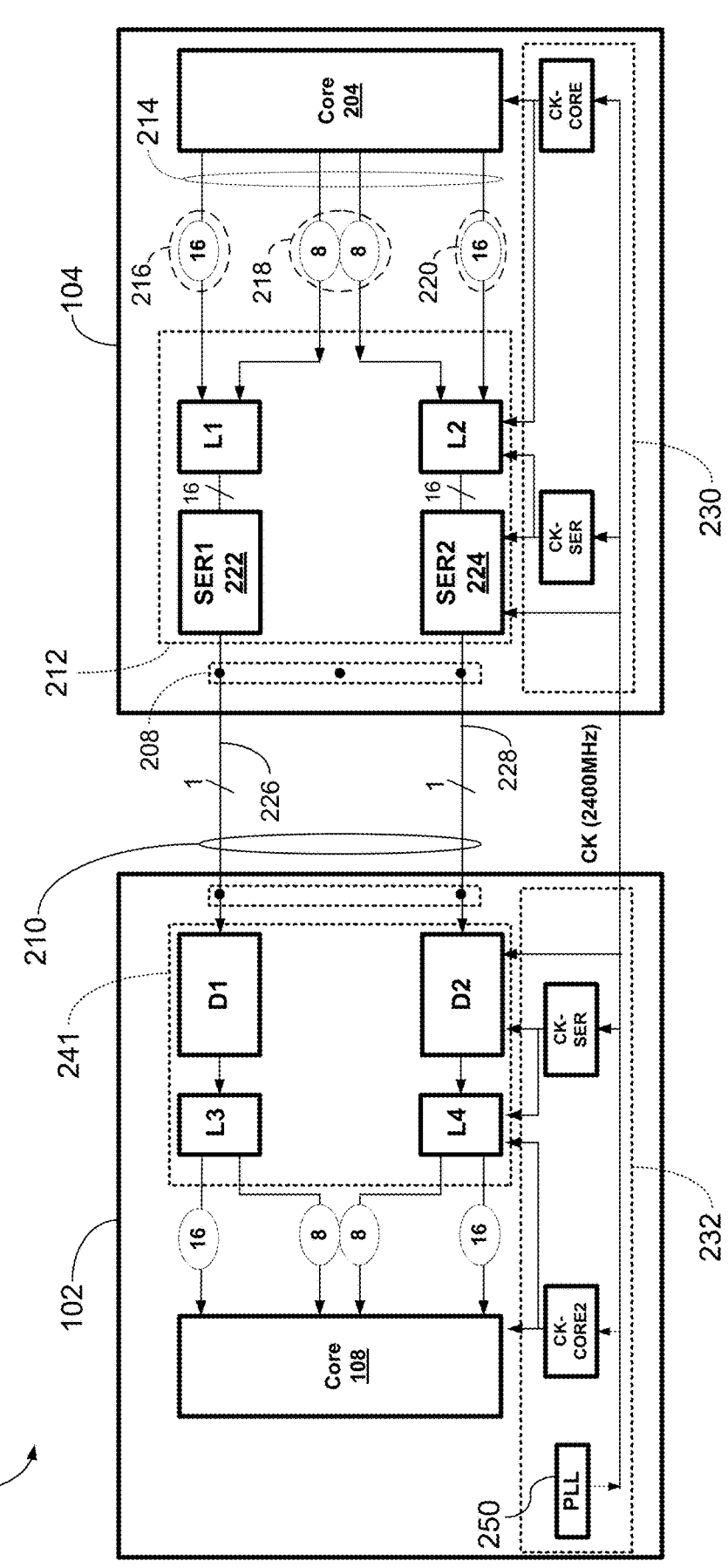
FIG. 2B illustrates a close-up portion of the architecture of FIG. 2A, including distribution logic according to an embodiment.

FIG. 2A illustrates further detail associated with the memory system architecture of FIG. 1, with a similar overall architectural view. FIG. 2B provides a partial close-up view associated with a pair of data links 210, shown in FIG. 2A along with a link that carries timing information, generally corresponding to the one or more clock links in FIG. 1. The specific embodiment of FIG. 2B corresponds to a design goal of achieving a ratio between the number of a given set of core I/Os to the number of data links of 48/2=24, which is a non-power of two value. Other ratio values are achievable through straightforward variations in the features described in detail below.

Further referring to FIG. 2A, a portion of one embodiment of the memory device 104 is illustrated, with respective first and second memory core quadrants 202 and 204 corresponding to a portion of the previously described memory core circuitry 122. The memory interface 126 is also shown to include pairs of DQ 212 (data) circuits and CA (control/address) circuits. At least one timing link 203 is shown coupled between respective clocking circuits CK1 and CK2 disposed on each chip 102 and 104. In one embodiment, the number of I/O paths interconnecting the memory core quadrants 202 and 204 to the memory interface 126 is on the order of 2048 (a power-of-two number). The I/O's may be grouped into core column subsets 214 that number, for example, 48 I/Os, to transport read data that will eventually be transmitted to a pin interface 208, then across the data links 210 to the memory controller 102. A corresponding portion of the memory controller 102 is also shown, but for clarity purposes at this point, only the memory device will be discussed in detail.

Referring now to FIG. 2B, at a high level, the memory device includes distribution logic 212 (in phantom) that, in one embodiment, corresponds to the 2XDQ circuit 212 of FIG. 2A, and is operative to distribute a first number of core data bit paths (in the context of read data) comprising the subset of core I/O's 214 to a second number of interface paths corresponding to the number of data links 210. In one embodiment, the distribution logic 212 cooperates with clock logic 230 (in phantom, corresponding to the clocking circuitry CK2 of FIG. 2A) to spatially transform the first number of core data bit paths (here, 48 paths) to the second number of link paths (here, 2 links) to achieve the desired non-power-of-two ratio (here, 48/2=24). As more fully explained in detail below, the clock logic provides a way to manage various ratios between clocks such as a bit rate clock CK, memory core clock CK-CORE, and memory interface clock CK-SER to support the ability to achieve non-power-of-2 ratios between the core I/O's and the data links.

Further referring to FIG. 2B, and beginning with the memory device core 204, the subset of 48 core I/Os 214 are organized into a plurality of I/O groups 216, 218 and 220. The first group 216 includes sixteen I/Os that are entirely fed to a first logic block L1. The second group also includes sixteen I/Os and directs half of the I/Os to the first logic block L1 and half of the I/Os to a second logic block L2. The third group of I/Os 220 are all fed to the L2 logic block. The effect of distributing three groups of sixteen I/Os to two logic entities L1 and L2 involves intermediately transforming the original 48 bit-wide I/O interface to one having 32 bits, or ⅔ the interface width. As more fully described below, the rate at which the bits are transferred are increased by ³⁄₂ in order to maintain the overall bandwidth between the memory device and controller. Managing the rate is handled by the clock logic 230, described more fully with respect to FIG. 3. The logic blocks L1 and L2 generate respective 16-bit wide and 1-bit deep outputs that are fed to respective 16:1 serializers 222 and 224 in response to an interface clock CK-SER. The serializers, in turn, each provide a serialized 1-bit wide (and 16-bit deep) output to respective serial links 226 and 228.

With continued reference to the channel circuitry 211 of FIG. 2B, the memory core 204 and memory interface 126 carry out timed operations consistent with respective core and interface clock signals CK-CORE and CK-SER. The clock signals are generated by the clock logic 230 that employs circuitry (described more fully below) to generate the plural clocks based on a bit rate clock CK 250, preferably comprising a phase-locked-loop (PLL) on the memory controller 102 and operating, for example, at 2400 MHZ. Generally, a bit rate clock is one that has at least one timing event (such as a rising or falling edge) per bit interval. In one embodiment, the clock logic is shared among all of the I/O circuits on the memory device 104, with appropriate fanout circuitry included to distribute the clock signals to the appropriate I/O logic. In other embodiments, duplicate copies of the clock logic may be included on the memory device such that groups of I/O's (such as bytes) may share the same clock signals.

Further referring to FIG. 2B, the memory controller provides circuitry to receive the read data, and provide inverse operations to convert the data from serialized form to parallel form, while managing the non-power-of-two ratio between the memory device core I/Os 216, 218, and 220 and the data links 210. With this in mind, the memory controller 102 includes redistribution logic 241 having deserializers D1 and D2, logic blocks L3 and LA, and a controller-based clock logic circuit 232, including a deserializer clock CK-D, and a memory controller core clock CK-CORE2. In one embodiment, the bit rate clock operates at a frequency of 2400 MHZ, while the interface clock operates at 300 MHz (⅛ the bit rate clock), and the core at 200 MHZ (⅔ that of the interface rate). The controller-based clock logic 232 is similar to that described with respect to the memory device 104, but configured to re-package the serialized read data back to its original form. Moreover, in one embodiment, the bit-rate clock is sourced by the controller-based clock logic 232, and fed to the memory device clock logic 230 via timing link 203.

Figure 3:
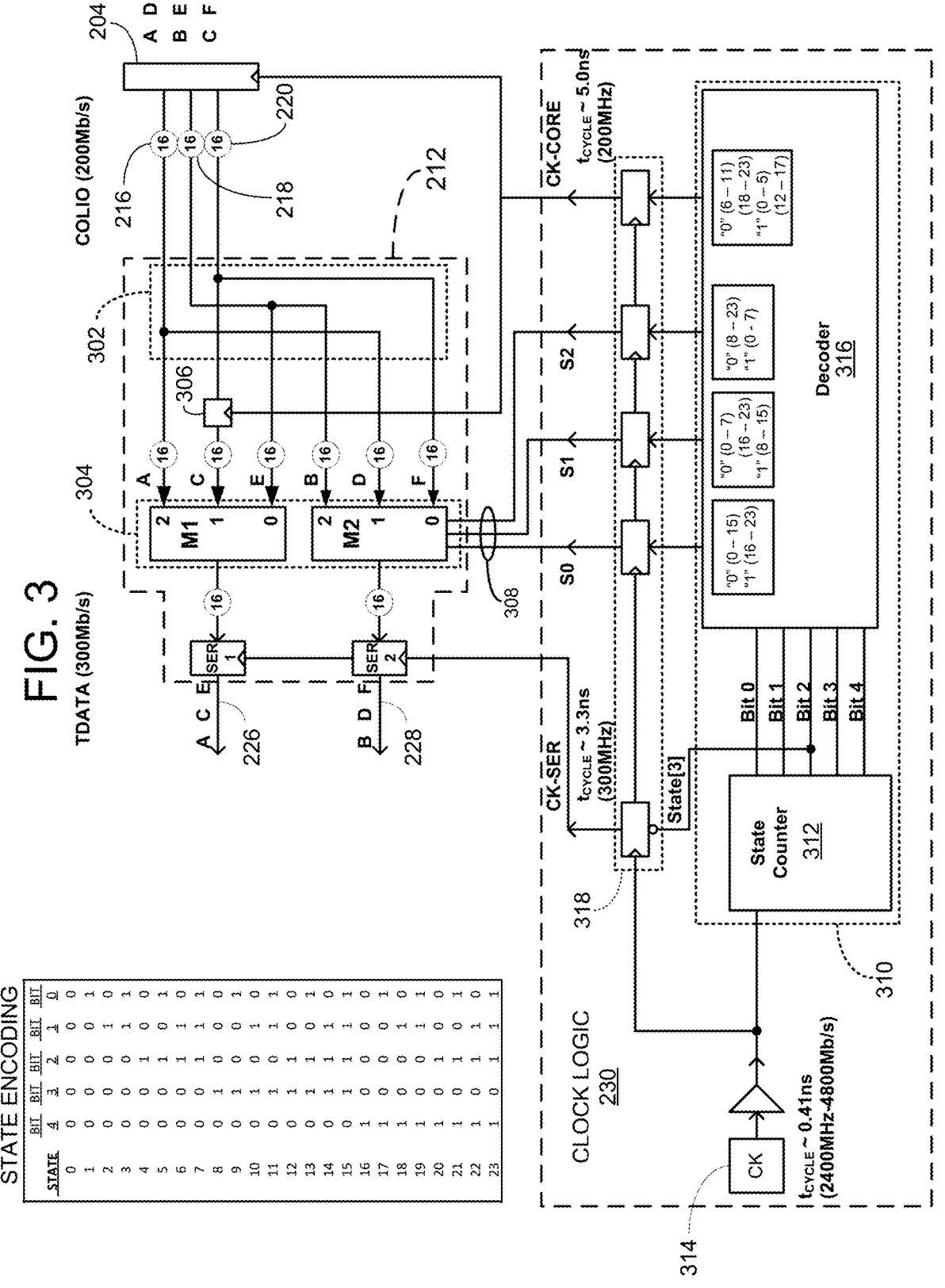
FIG. 3 illustrates the distribution logic of FIG. 2 in further detail.

FIG. 3 illustrates further detail for one embodiment of the memory device, including the core circuitry 204, distribution logic 212 and clock logic 230 noted above with respect to FIG. 2B. The structure and operation described generally corresponds to that employed for a read operation, where data is accessed from the memory core 204 and eventually provided to the memory controller 102. In the embodiment shown, 48 core column I/O's are grouped into distinct subsets of 16 I/Os, corresponding to the previously identified I/O sets 216, 218 and 220 (FIG. 2B), except that six sets of data, sets A-F, are organized for transmission over two memory core clock CK-CORE cycles. In this manner, each set of 16 I/Os is configured to transfer a two-byte (sixteen bit) chunk of data from the core 204 over a timing interval associated with the core clock CK-CORE. The core clock is generated by the clock logic 230 more fully discussed below.

Further referring to FIG. 3, the column I/O's 216, 218 and 220 are routed along a plurality of data paths defining a routing network 302 to selection logic 304 that, in one embodiment, form a pair of multiplexers M1 and M2. The first multiplexer M1 includes three sets of 16-bit wide inputs to receive data corresponding to data blocks A, C and E, while the second multiplexer M2 includes similar inputs to receive data blocks B, D, and F. A delay element 306 is interposed between the first multiplexer M1 and the memory core 204 to delay receipt of the C data at the first multiplexer M1 such that it arrives somewhat concurrent with receipt of the D data at the second multiplexer M2 (the D data being transferred during the second core clock cycle). Each multiplexer includes a set of control inputs 308 responsive to one of three control signals S0-S2 to select passage of one of the data groups arriving at a corresponding one of the three multiplexer inputs through to serializers 222 and 224. In one embodiment, the control inputs 308 to the multiplexers M1 and M2 are duplicated so that both components operate to select the same multiplexer input path concurrently. Each multiplexer employs a 16-bit wide output that corresponds to the width of each of the three data inputs, thus forming a 3:1 selector. As noted above, the serializers 222 and 224 each convert a sixteen-bit wide and 1-bit deep parallel input to a 1-bit wide 16-bit deep serialized output for transmission along each data link 210.

In order to efficiently clock the memory core 204 and the distribution logic 212 described above such that total bandwidth is maintained to achieve the noted power-of-2 ratio between core I/Os and link rates, one embodiment of the clock logic 230 employs a state machine 310 that includes a multi-bit state counter 312 responsive to the bit-rate clock 250 (FIG. 2B). The bit-rate clock CK is received at a clock pin 314 as a high-speed clock signal that, in one embodiment, is generated off-chip by the PLL circuit 250. The state counter 312 receives the high-speed clock signal, and in response to each rising edge of the clock signal, increments a 5-bit count value bounded between count values 0 and 23, and generates an output along a plurality of bit lines Bit 0-Bit 4. The 24 separate values of the count represent individual states for decoding by a decoder 316 to establish the multiplexer control signals S0-S2, the interface clock CK-SER, and the memory core clock CK-CORE. The encoding of the states is shown in the "State Encoding" chart of FIG. 3, in terms of the respective values for each bit (Bit0-Bit4). Although 32 states are possible with the 5-bit counter, the count resets to 0 after reaching a count value of 23, or after every 24ᵗʰ increment. The number of states, and thus the count, in one embodiment, is based on the lowest common multiple between the bit-rate clock CK (here, 2400

MHZ), the interface clock CK-SER (here, 300 MHZ) and the core clock CK-CORE (here, 200 MHz).

As mentioned above, the state counter 312 is configured in a manner that allows it to essentially generate clock signals that are different from, but based on, the bit rate clock signal CK. By looking at the state encoding chart, it is apparent that to generate a clock waveform at $\frac{1}{8}^{th}$ the bit rate of the bit rate clock CK, a waveform need only periodically change values (from 1-0 and 0-1) every 8 states. Thus, by tapping off of the BIT 3 path, the interface clock CK-SER may be generated. In a similar manner, the memory core clock is generated, recognizing that every six states of the state machine corresponds to a core-clock high or low transition.

Thus, depending on the application, the state machine 310 may be configured to generate plural clocks based on a single bit rate clock. This not only enables the distribution logic 212 to carry out its data distribution function while maintaining a desired bandwidth, but significantly reduces power consumption on the memory device 104, rendering it especially suitable for low-power mobile applications.

As explained above, the ability to generate an interface clock signal CK-SER (in this embodiment running at 300 MHz) that runs at $\frac{3}{2}$ times the rate of the core clock signal CK-CORE (in this embodiment running at 200 MHz) is a significant benefit. This particular ratio in relative clocking enables total bandwidth to be preserved when reducing the bit paths from forty-eight to thirty-two (a $\frac{3}{2}$ reduction in bit paths in the interface), resulting in a non-power-of-2 ratio between the subset of 48 core I/O paths and the two data links. This may be contrasted to a typical power-of-2 ratio between the same 48 core I/O's and, for example, three data links (which would result in a power-of-2 ratio value of 16). By using $\frac{2}{3}$ as many data links to achieve the non-power-of-2 ratio, an interface clock rate that is $\frac{3}{2}$ faster is employed in order to maintain the overall bandwidth. Of course, other ratios may be straightforwardly achieved using the circuitry and associated principles described above. In one embodiment, more fully set out below, multiple modes of operation to enable a user to select between various core I/O to link ratios are available.

Figure 4:
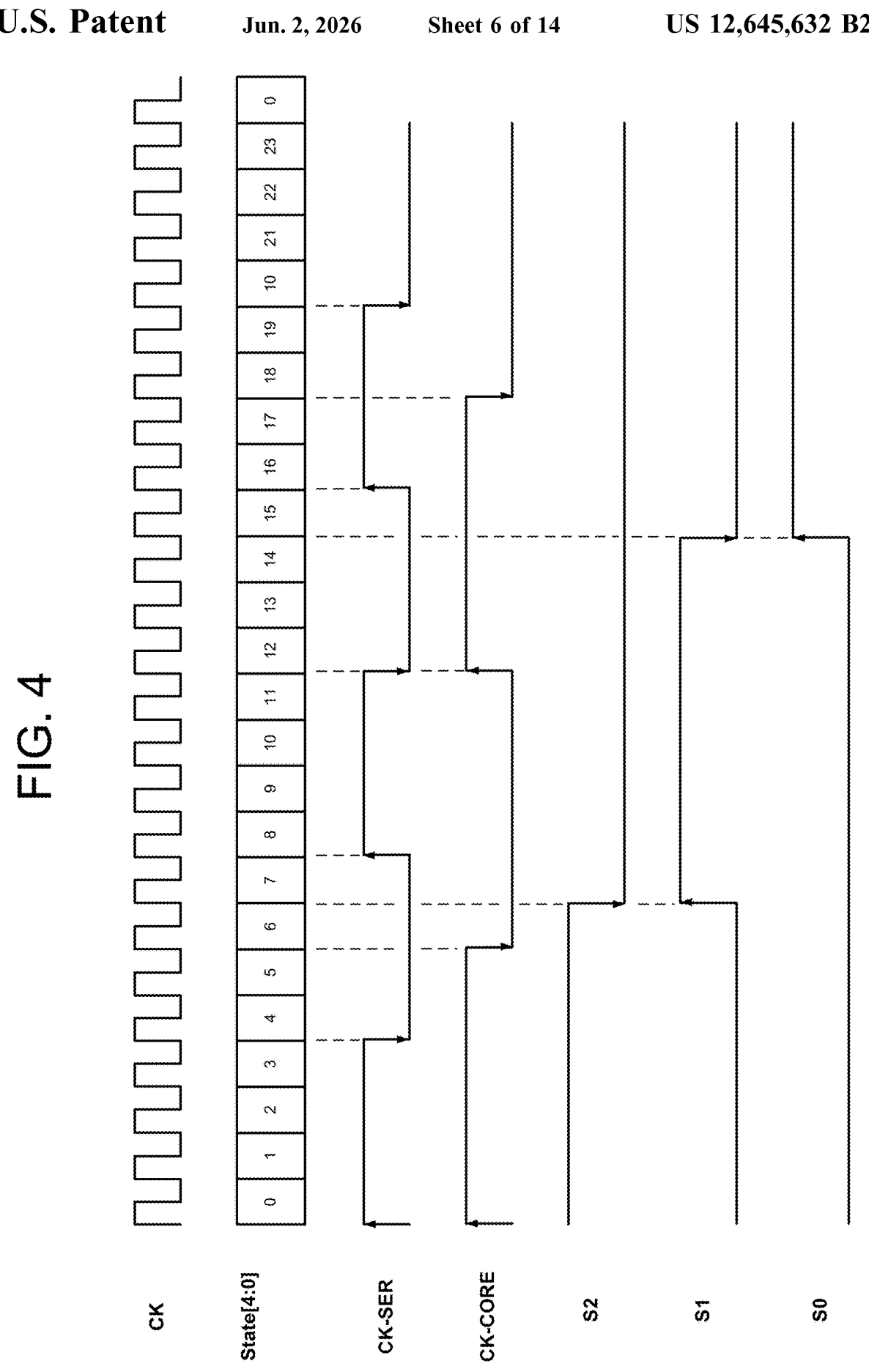
FIG. 4 illustrates a timing diagram of the distribution logic of FIG. 3.

FIG. 4 illustrates exemplary waveforms and associated timings between the various clock signals CK, CK-SER and CK-CORE, and the multiplexer control signals S0-S2 generated by the state machine 310. The high-speed bit-rate clock signal CK is shown as a reference across the top of the illustration, with the states 0-23 correlated to the bit-rate clock waveform along the row labeled "State [4:0]." To achieve an interface clock CK-SER frequency of 300 MHz, or $\frac{1}{8}^{th}$ the bit-rate clock frequency, the decoder logic 316 generates a periodic waveform every eight states, with the waveform being "high" for a period of four states, then "low" for four states. This waveform is shown along with the row labeled "CK-SER." As explained earlier, the binary nature of the counting logic enables this to be accomplished merely by tapping off the third bit BIT 3 of the counter 312, which is "high" for eight states, then "low" for eight states, and so on. Similarly, to generate a core clock CK-CORE frequency of 200 MHz, or $\frac{1}{12}^{th}$ the bit-rate clock frequency, the decoder 316 outputs a periodic waveform every 12 states (high for six states, then low for six states). This waveform is shown in the row labeled "CK-CORE." Further, to generate the three multiplexer control signals S0-S2, the 24 states are divided into thirds, with each control signal being high during an assigned third of the states. The respective waveforms are labeled S2, S1 and S0 accordingly.

Figure 5:
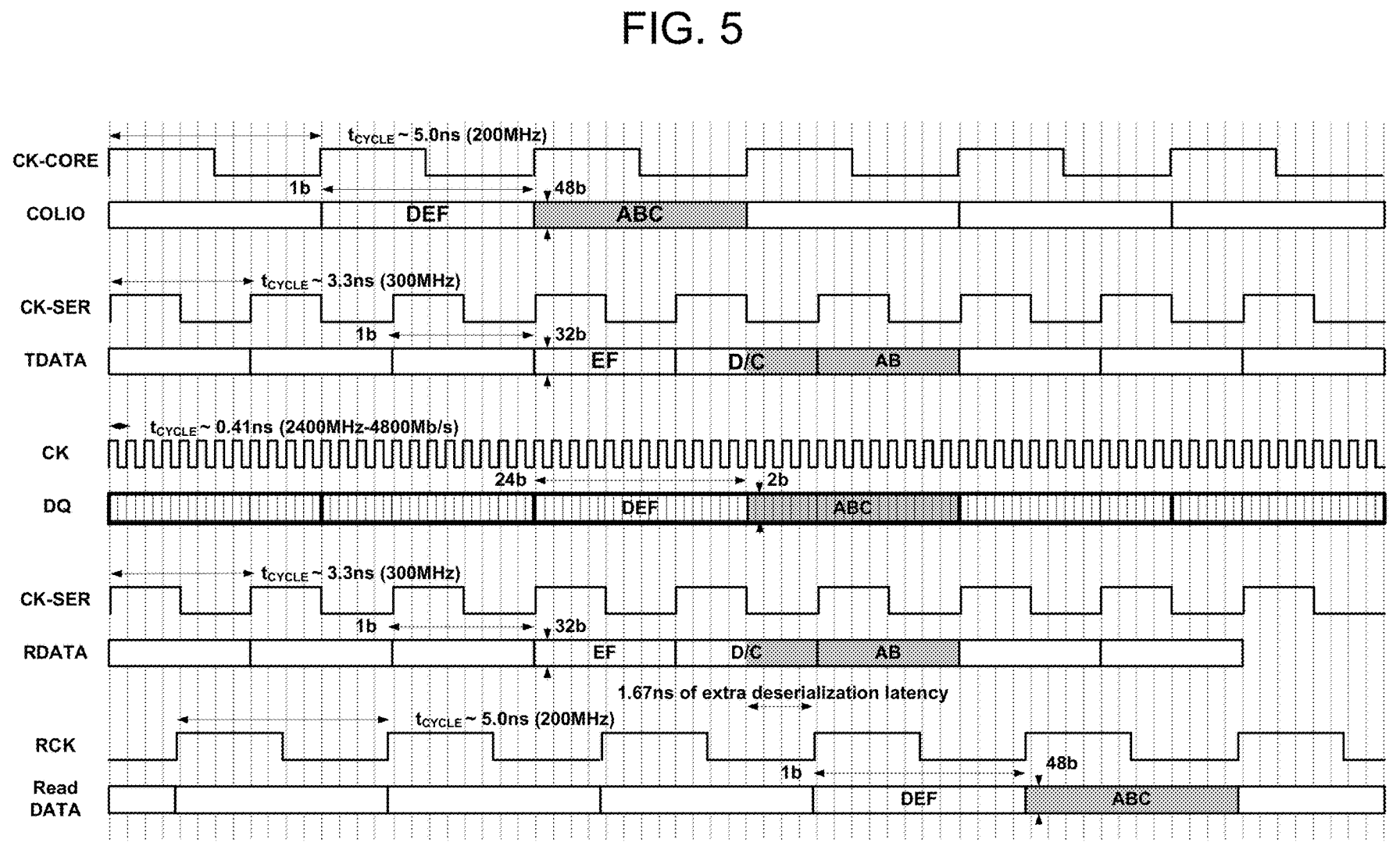

With reference to FIGS. 3, 4 and 5, detailed operation of the distribution logic 212 and clock logic 230 involves first clocking out data groups A, B and C in parallel on the rising edge of a first core clock cycle CK-CORE which corresponds to the initiation of State 0. Each data group is 1-bit wide, and 16-bits across for a total of 48 bits for the three groups. FIG. 5 illustrates the collection of 48-bit groups ABC and DEF, and their relationship to each core clock cycle CK-CORE. Data groups A and B are first distributed to the respective top inputs of the multiplexers M1 and M2, shown in FIG. 3, while the third data group "C" is delayed by the delay element 306 by at least a half cycle of the core clock. The passage of the data associated with groups A, B and C are shown in FIG. 5 along the row labeled "TDATA." At this point, with the A and B data groups valid at the multiplexer M1 inputs, and the states being between 0-7, the control input S2 is generated, enabling the A and B data groups to pass through to the serializers 222 and 224. The serializers then convert the A and B data from the respective 16-bit wide and 1-bit deep groups, to two 1-bit wide and 16-bit deep groups for transmission across the serial links 210.

Further referring to FIGS. 3 and 4, at the rising edge of the next core clock cycle, beginning with State 12, data groups D, E and F are clocked out to the multiplexers M1 and M2. At this point, data group C is also received at the first multiplexer M1, being delayed by the delay element 306. With control input S1 being high between states 8-15, data groups C and D are passed to the serializers 222 and 224 for serialization, with the C group data being serialized and transferred at the trailing end of the A and B group, as shown in the "DQ" row of FIG. 5. Upon activation of control input S0, at State 16, the multiplexers M1 and M2 pass data groups E and F to the serializers 222 and 224 for serialization and transmission of the data groups D, E and F along the links. Following state 23, the counter resets to 0, and new data groups are transferred consistent with the above steps.

At the memory controller 102, the serialized data groups A-F are deserialized and reassembled in a manner that takes into account the data distributing and converting carried out within the memory device interface circuitry 126 by the distribution logic 212 and clock logic 230. This involves employing similar interface circuitry to that of the memory device to carry out inverse operations in the controller and to maintain appropriate timing in the memory system 100.

As alluded to above, the memory device interface circuitry 126, including the distribution logic 212 and clock logic 230, is presented herein primarily in the context of read circuitry for carrying out read operations. The principles described above are equally applicable for write circuitry to carry out write operations by employing deserialization circuitry in the memory interface to receive the serialized write data from the serial links 210 and convert the write data to parallel form, and distribution logic to package the write data for routing to the memory core 122 that is generally inverse in construction and operation to that described for read operations.

In the memory interface embodiment described above, certain design parameters may be varied or made programmable to allow for flexible core I/O to link ratios. For instance, providing multiple copies of the distribution logic and clock logic configured to effect different ratios between the core column I/O's and the data links, a desired ratio may be selectable merely by employing additional selection circuitry or enable circuitry responsive to programmable inputs.

Figure 2C:
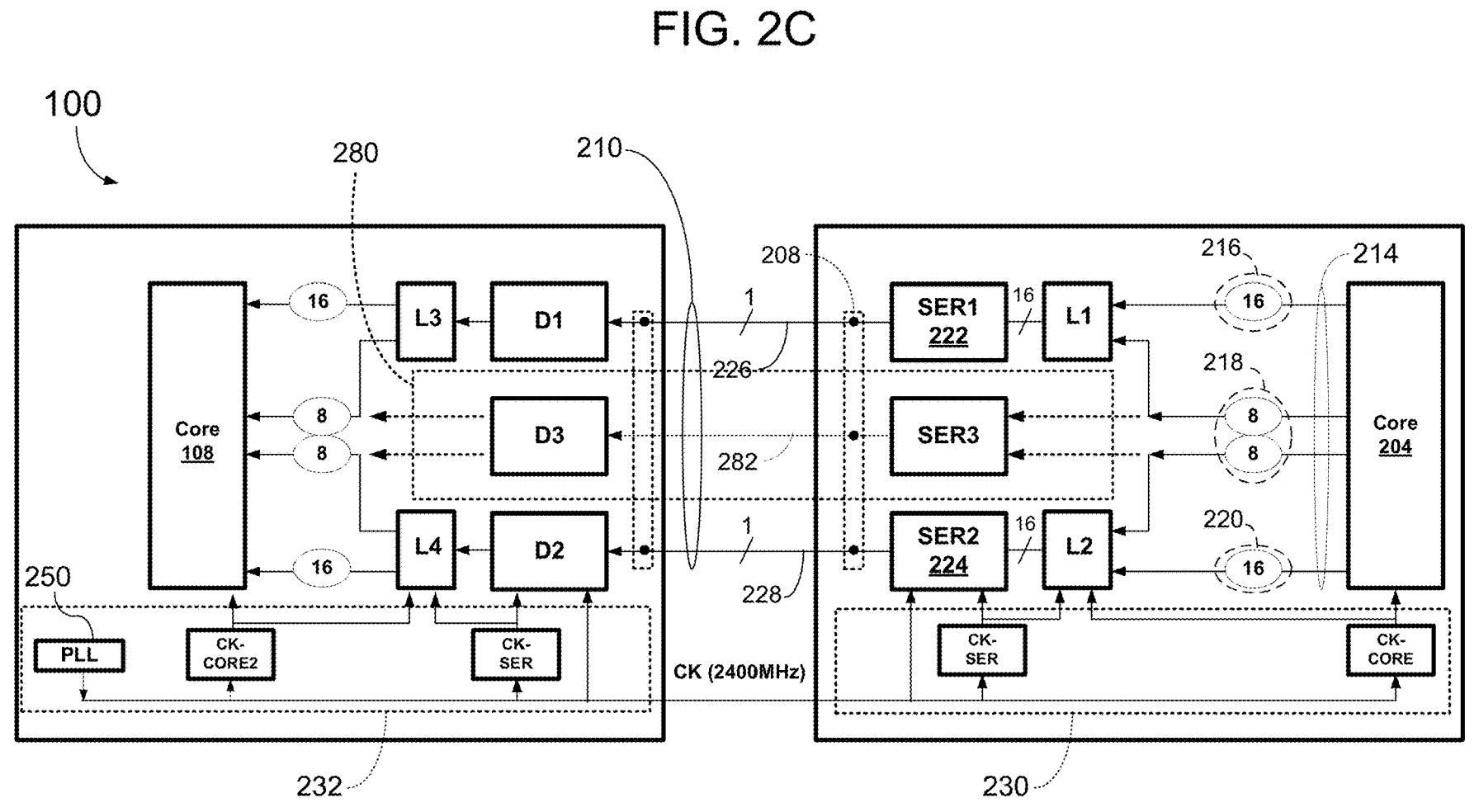

In an optional embodiment illustrated in FIG. 2C, an additional signal path 280 including an additional link 282 may be employed to provide a selectable mode of operation where the ratio between the 48 column I/O's and the three data links results in a power-of-2 value (in this modal implementation, the value is 16). For such a mode, the distribution logic and clock logic may be simplified, or even bypassed, such that each group of column I/O's 216, 218 and 220 directly feed into a corresponding serializer SER1, SER2, and SER3. The power-of-2 mode may be selectable through use, for example, of a programmable register that stores a first value for the power-of-2 mode, and a different value for a non-power-of-2 mode.

For system applications where, for example, multiple memory devices are employed with one or more memory controllers in system-in-package (SIP) or multi-chip package (MCP) environments, the ability to provide a maximum number of memory devices for optimum memory capacity and bandwidth is highly desirable. The flexibility in enabling for non-power-of-2 ratios between device core I/O's and available links enables significant pin count reductions for SIP and MCP applications without compromising total bandwidth capabilities.

FIGS. 6A-12 illustrate a further embodiment of the disclosure, where modifications to serialization and deserialization circuitry may be employed to achieve flexible core I/O to link ratios with correspondingly adjustable data rates. The changes in the serialization/deserialization circuitry may be viewed as a temporal alternative to the spatially-based scheme described above and illustrated in FIGS. 2-5.

Figure 6A:
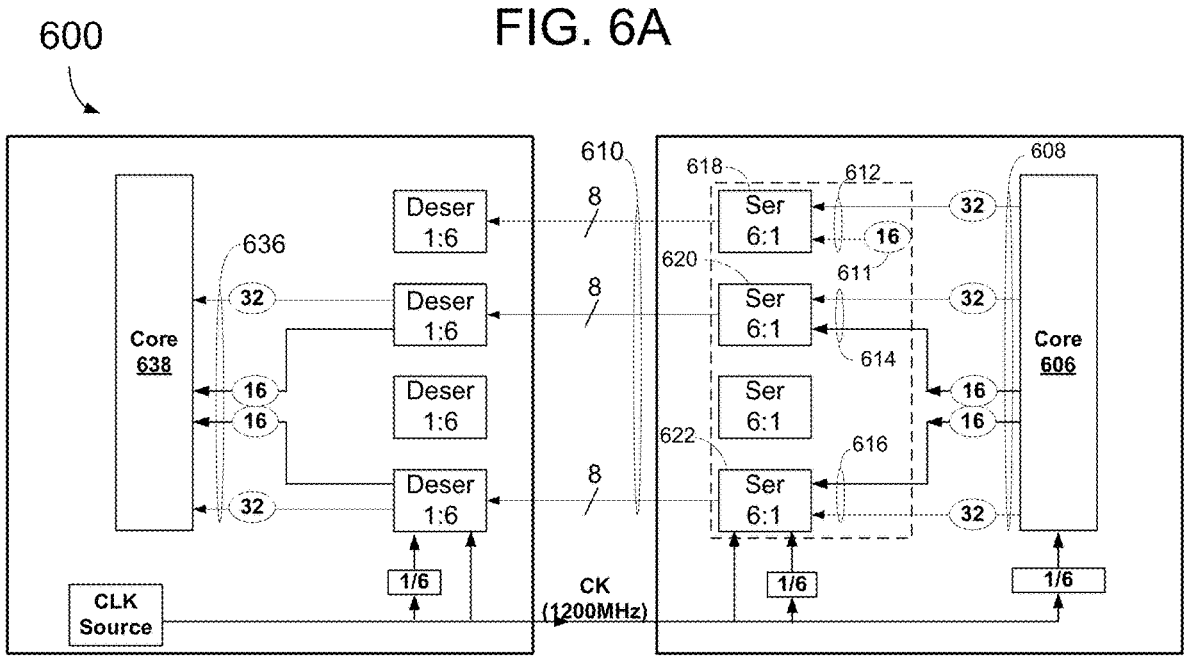
FIGS. 6A and 6B illustrate respective memory systems configured similar to that of FIG. 2 in accordance with further embodiments.

Referring now to FIG. 6A, a portion of a memory system 600 is shown associated with a group of 24 data links 610. The memory system 600 includes a memory controller 602 and a memory device 604. The links 610 are configured to transfer read data from the memory device circuitry 604 to the memory controller circuitry 602 similar to the architecture exhibited in FIG. 2B (which represents a portion of the architecture of FIG. 2A). The memory device portion 604 includes core circuitry 606 that is accessed by core I/O's 608. The core I/O's are arranged into groups totaling 128 I/O's and supplemented by one or more groups of reserve I/O's 611 such that three groups of 48 I/O's 612, 614 and 616 may be formed and routed to three corresponding serializer circuits 618, 620 and 622 provided in a memory interface 626. Thus, of the 144 bits of data transferred, 128 bits contain read data from the core 606 and 16 bits comprise other "default" data. The serializer circuits 618, 620 and 622 generate a serialized output where, for this specific example, every six input bits are serialized into a single output (a 6:1 serialization conversion). Consequently, for a 48-bit wide and 1-bit deep input, each serializer generates an 8-bit wide and 6-bit deep output. Thus, read data accessed from the core 606 over the initial 144 core I/O's 608 are transformed by the interface circuitry 626 for passage along a total of 24 serial links 610, for a core-to-link ratio of 144/24=6, a non-power-of-2 value.

Further referring to FIG. 6A, the 24 data links 610 described above provide serialized data to a memory controller portion 602 of the channel circuitry 600, where respective deserializer circuits 630, 632 and 634 receive the serialized data from the three groups of eight data links 610, and deserialize the data streams in an inverse manner to how the streams were originally serialized. The resulting parallel data generated by the deserializer circuits is then routed to appropriate groups of I/O's 636 for receipt by a controller core 638, and routed to whatever host application requested the data.

With continued reference to FIG. 6A, the clocking arrangement applied to the memory system channel circuitry 600 employs a bit rate clock CLK that operates, for example, at 1200 MHz, and a core clock CLK-CORE that operates at $\frac{1}{6}^{th}$ the frequency of the bit rate clock. In one embodiment, the memory interface 626 and controller interface generally run at the bit rate clock CLK.

While circuitry to carry out read operations is described above for clarity purposes, circuitry to handle write operations generally involves utilizing the links as bidirectional links and incorporating serializers on the controller side of the channel, and deserializers on the memory device end of the channel. Similarly, transferring control/command/address information carried along the CA links involves serialization and deserialization operations like those utilized for transferring write data.

Figure 6B:
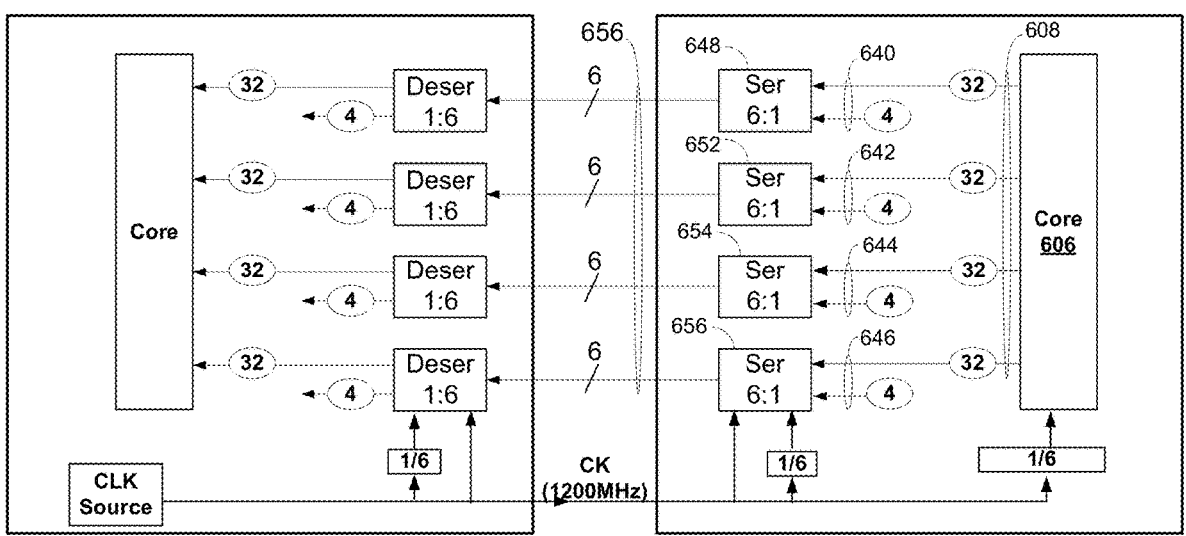

FIG. 6B illustrates a variation to the embodiment of FIG. 6A, where instead of grouping the 144 core I/O's 608 into three groups for distribution from a memory core 606 to three serializers, the 144 core I/O's are grouped into four groups of 36 I/Os 640, 642, 644 and 646, and fed to four corresponding serializers 648, 650, 652 and 654 to generate serialized output data streams along four sets of six serial links 656. Similar to the embodiment of FIG. 6A, the resulting core I/O to link ratio is 144/24=6, a non-power-of-2 number. In either embodiment, 16 of the I/O's fed to the serializers are "reserve" I/O's that do not actually access the memory core 606.

The embodiments illustrated in FIGS. 6A and 6B may be further extended to provide multi-modal support for both power-of-2 ratios and non-power-of-2 ratios, similar to that described in FIG. 2C for the spatial embodiments. Features explained and disclosed pertaining to particular embodiments may be used in other embodiments.

Figure 7:
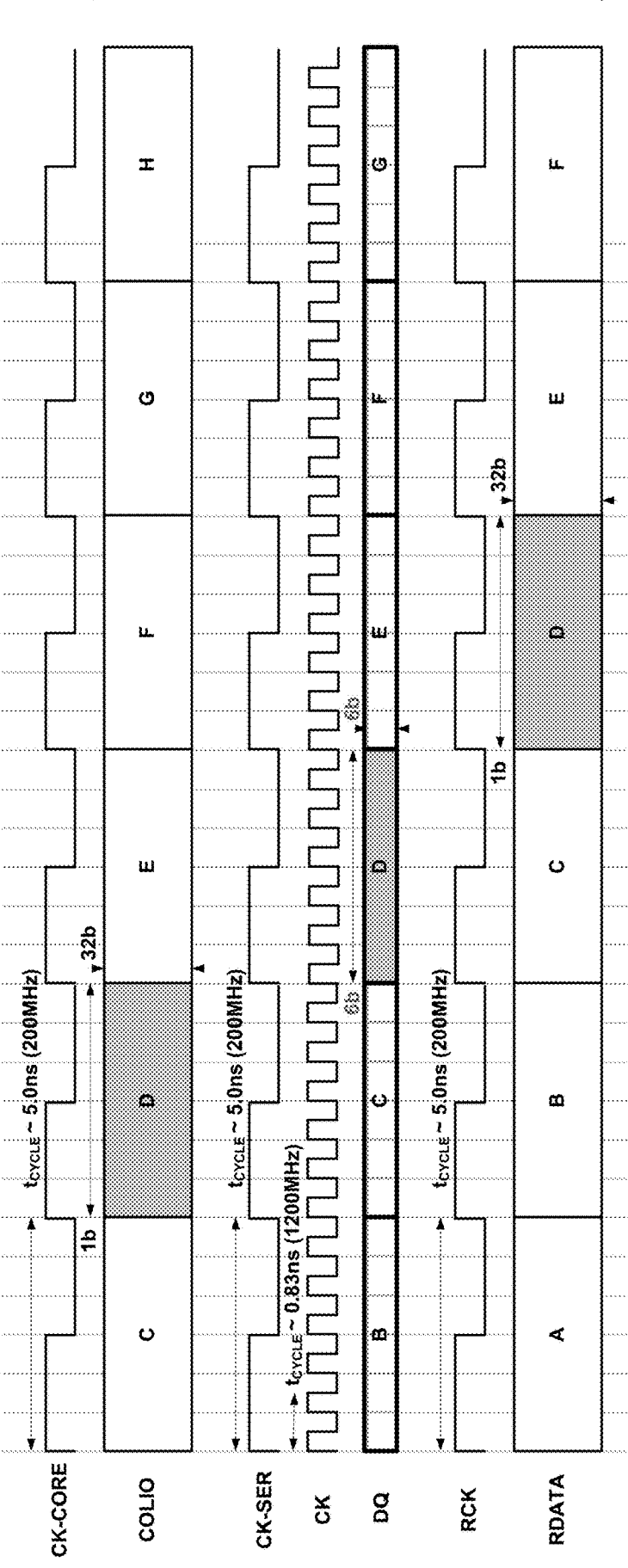
FIG. 7 illustrates an operational timing diagram of the memory system of FIG. 6.

FIG. 7 illustrates the basic timing involved in transferring a group of 32 data bits from the memory core 606 to the controller core 638 utilizing the approach shown in FIG. 6B. The core clock CK-CORE is provided across the top of the timing diagram and controls the timing for transferring each 32-bit wide and 1-bit deep group of data bits. Group "D" illustrates the progression of an exemplary data group. On a first core clock cycle, the data bits are combined with 4 reserve bits, and received by a serializer, such as 648, as a group of 36 bits. On the subsequent core clock cycle, the 36 bits are converted into a group of data bits that are 6-bits wide and 6-bits deep in response to timing generated by the bit rate clock CK. Each 6-bit deep stream is then transmitted across a corresponding DQ link (such that 6 links transmit the 36 bits). The controller portion 602 of the channel circuitry 600 receives the 36 bits and deserializes the data back to a 32-bit wide and 1-bit deep group of data bits (discarding the 4 reserve bits inserted at the memory device end). While the timing diagram matches up with the embodiment of FIG. 6B, utilizing 6 links for each group of 32 core I/O's, the timing would be similar for the embodiment of FIG. 6A, with 8 data links employed instead to transfer each group of 32 core bits.

Figure 8:
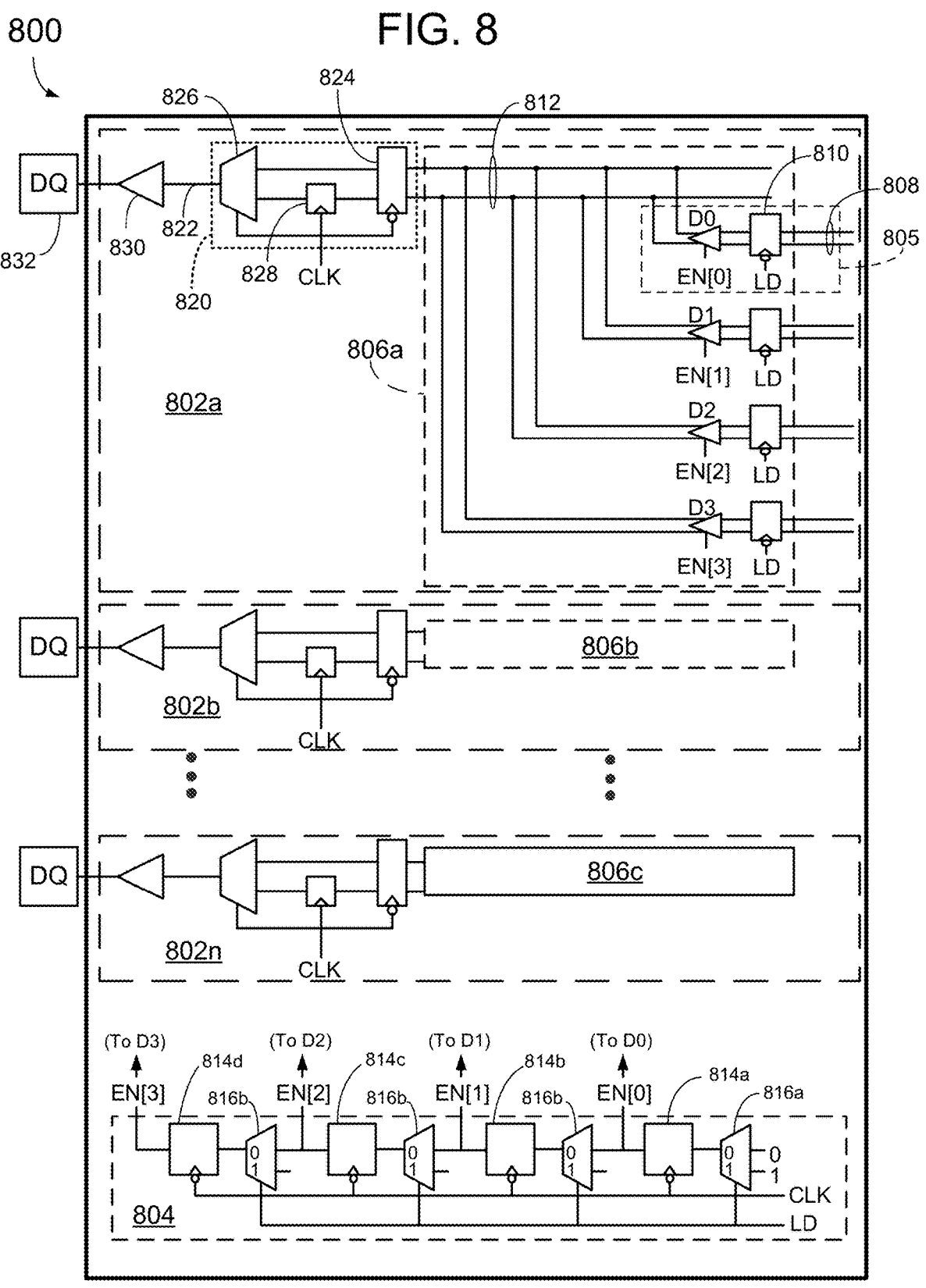
FIG. 8 illustrates one embodiment of the distribution logic of FIG. 6 in further detail.

In order to carry out the data bit serialization, progression and deserialization steps generally outlined above, the serializers and deserializers employ circuitry more fully detailed below that enables the memory and controller interfaces to temporally distribute the data bits. Referring now to FIG. 8, one embodiment of a serializer 800, such as that employed in the embodiment of FIG. 6B, provides the ability to vary the serialization rate of an input stream of data bits for each DQ pin. This variability enables the link data rate to be increased or decreased by factors that may result in overall core I/O to link ratios that may be other than a power-of-2 value.

With further reference to FIG. 8, the serializer 800 employs a plurality of DQ circuit paths 802a-802n and a control circuit 804. A maximum number of "N" DQ circuit paths are provided to allow for flexibility in providing a ceiling in the number of output links supported. During operation, a selectable subset of the DQ paths will be programmed for use, often employing fewer DQ circuit paths than the maximum number available.

Further referring to FIG. 8, each DQ circuit path 802 in the serializer 800 includes a plurality of input data paths 805 that are available for use, depending on the desired serialization rate. The input data paths (for each DQ circuit path) together form a parallel-serial input circuit 806. The input circuits are labeled 806a-806n to correspond to the DQ circuits 802a-802n. In one embodiment, serialization rates of 2, 4, 6 and 8 may be selected, corresponding to the use of 2, 4, 6, or 8 of the input paths for each DQ circuits. The first input path will be described with the understanding that the other input paths are constructed similarly. The first input data path includes a pair of data bit conductors 808 that feed a load register 810. The load register responds to the falling edge of a load signal LD. A state machine (not shown), similar to the state machine described in detail above and illustrated in FIG. 3, couples to the serializer 800 and is configured to generate the load signal LD and other timing signals noted below. The output of the load register 810 feeds a data driver DO that responds to an enable signal EN[0] that is generated by the control circuit 804. Each input data path couples to a load path 812 via the associated load register and data driver. The load path includes a pair of conductors to sequentially direct each pair of inputs from the input paths to the serialization circuitry.

In order to sequence the data bits presented by the input data paths 805 in a manner consistent with the desired serialization rate, the control circuit 804 employs a delay line of registers 814a-814d alternated with multiplexers 816a-816d to divide an input load signal (essentially the "slow" memory core clock signal CLK-CORE) into a number of equally spaced-apart timing intervals equal to the desired serialization rate. The number of registers 814 used during operation is selectable and based on the desired serialization rate, where one register is used for a ratio of 2:1, two registers for 4:1, three registers for 6:1, and four registers for 8:1. Each register 814 includes a clock input responsive to the falling edges of the bit rate clock CLK (the "fast" clock) and a data input that receives the data value from the previous register via the preceding multiplexer 816. Each register output is fed to the next succeeding register, via an associated multiplexer, and tapped to form an enable signal EN for application to a corresponding driver D associated with one of the pair of input data paths 805.

Further referring to FIG. 8, the pair of serialized data streams generated on the load path 812 for each DQ circuit 802 are received by an interleaving circuit 820 to alternately pass data bits along the pair of data streams to a single data link 822. The interleaving circuit includes a register 824 clocked to the bit rate clock CLK and a 2:1 multiplexer 826 having a pair of inputs coupled to the register outputs and also clocked to the bit rate clock CLK. A delay register 828 is interposed between the multiplexer 826 and the register 824 along one of the paths and clocked to the rising edge of the clock CLK to offset the associated data stream by half a cycle, thus time-staggering one of the streams with respect to the other. The time-staggered stream and non-staggered stream are presented as inputs to the multiplexer 826 and interleaved as the multiplexer output in response to the rising and falling edges of the clock CLK. The interleaved data stream is then fed to a buffer 830 and presented to a DQ output pin 832 for transmission across a corresponding link.

Figure 9:
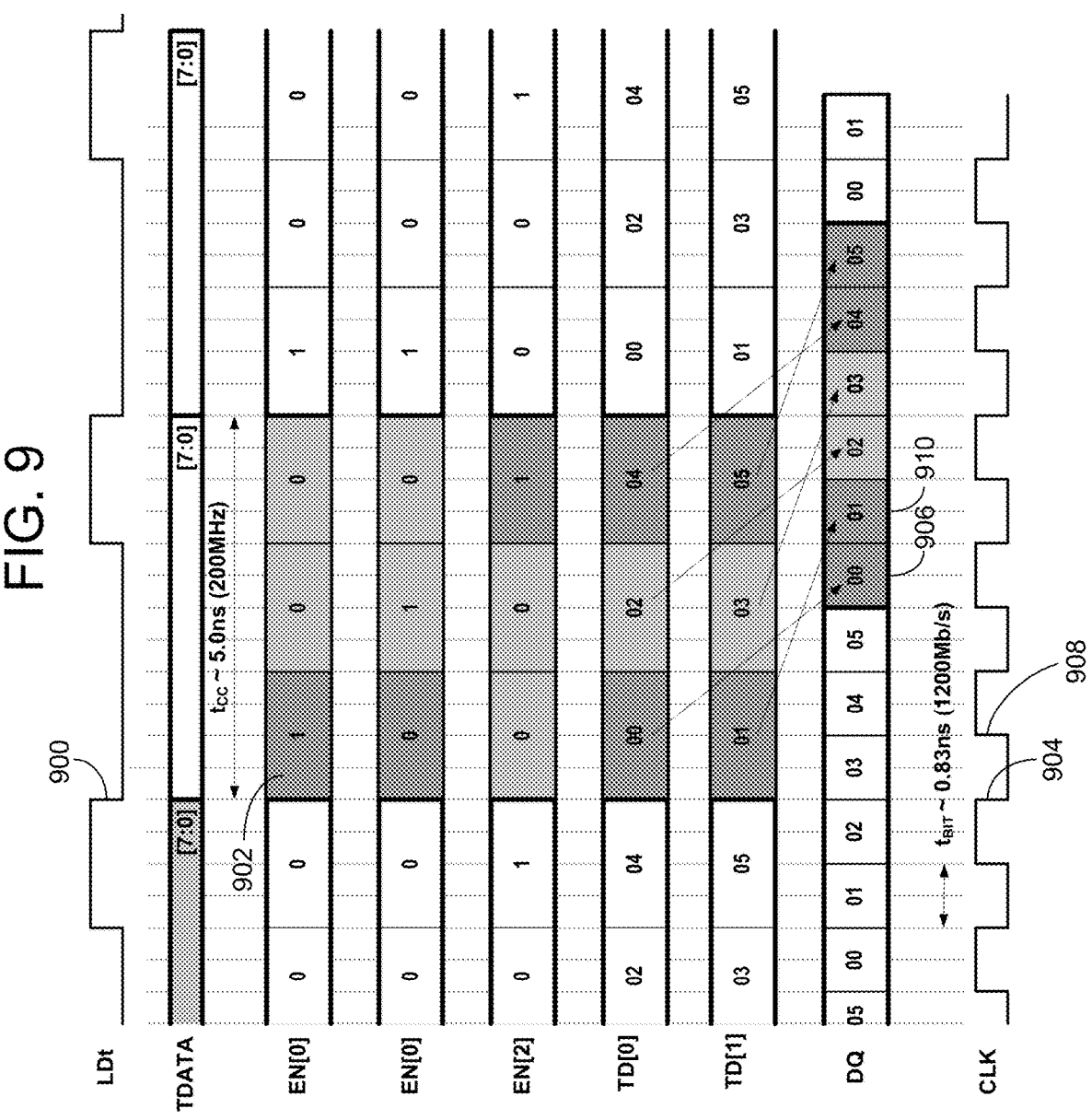
FIG. 9 illustrates a timing diagram associated with the distribution logic of FIG. 8.

FIG. 9 provides a timing chart that serves as a visual depiction of the progression of data through one DQ circuit, such as 802a of the serializer circuit 800 of FIG. 8. In this example, three of the four input data path circuits 805 are employed such that an incoming six bits from the core may be received. As a result, only three enable signals are needed to actuate the respective drivers D0-D2. The load signal LD is shown across the top of the diagram, where the falling edge, such as at 900, generally triggers loading of the data onto the input paths 805 and into the load registers 810. The enable signals EN[0], EN[1] and EN[2] are then sequentially generated in response to falling edges of the bit rate clock CLK, with the first enable signal EN[0] being valid at 902 in response to the falling edge of the bit rate clock CLK, at 904. Responsive to the valid indication (a logic "1") of the first enable signal EN[0], and a falling edge of the clock CK, a first bit of data "00" from one of the two load paths 808 is presented to the data link DQ at 906. A half cycle later, on the rising edge of the clock CLK, at 908, a second bit "01" is presented to the data link at 910. Similar steps are carried out sequentially with respect to the other enable signals EN[1] and EN[2] such that during the load signal LD interval, all six bits from the input data paths are presented to the data link, resulting in a 6:1 serialization ratio.

Figure 10:
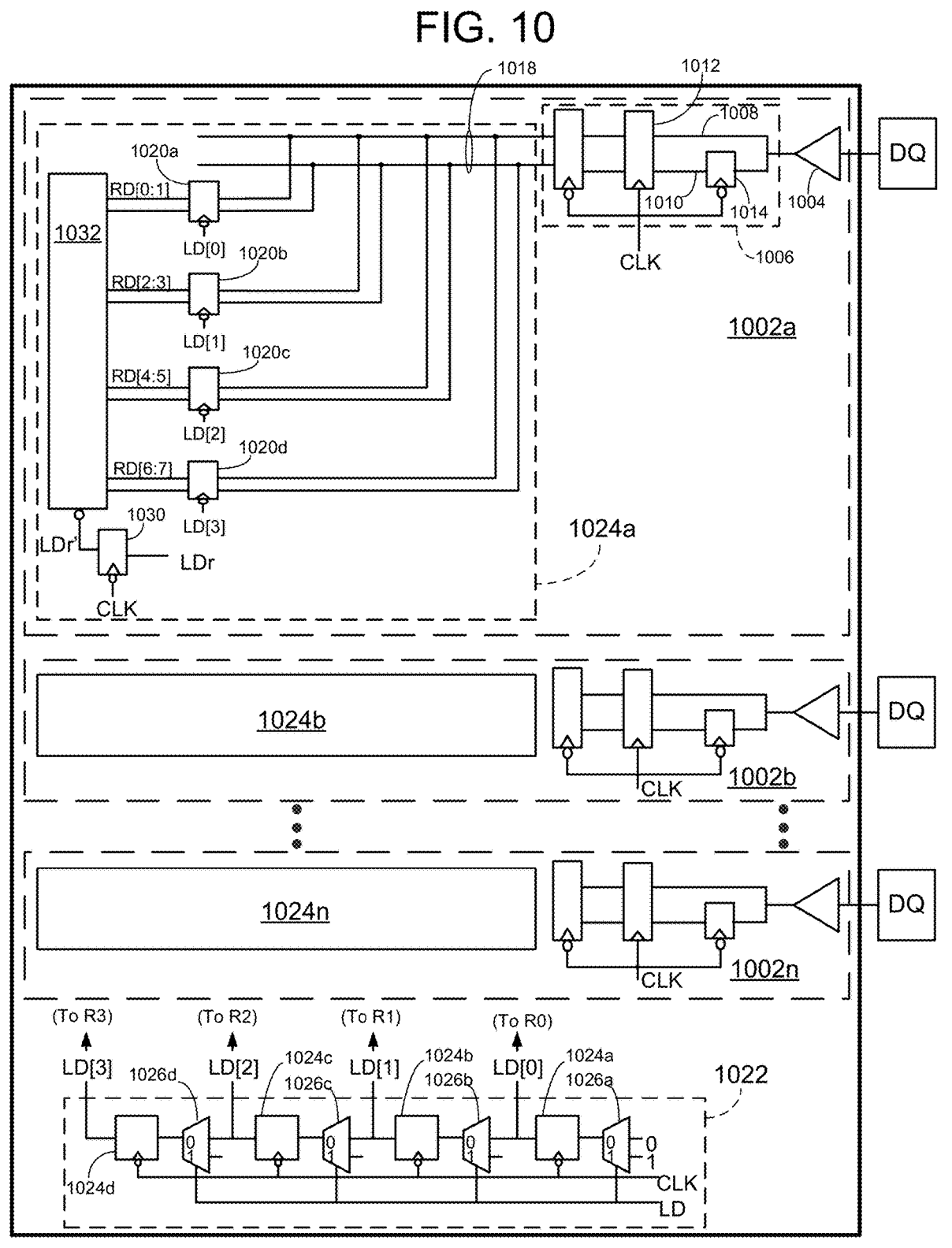

FIG. 10 illustrates an embodiment of a deserialization circuit 1000 to complement the serializer circuit 800 of FIG. 8 to either serve as the deserializing circuitry on the memory controller 602 and/or provide a deserializing capability on the memory device 604 for write operations. Similar to the serializer circuit 800, the deserializer circuit 1000 includes a plurality of DQ circuits or slices 1002a-1002n that are selectable for use in a given application depending on whether a corresponding link partner is in use on the other end of the link. Each DQ circuit 1002 includes a receive buffer 1004 that receives a serialized data bit stream from a corresponding serial link pin DQ and drives the stream into a de-interleaving circuit 1006. The de-interleaving circuit includes parallel paths 1008 and 1010 that receive respective copies of the data stream from the receiver buffer 1004. The first path provides one input to a register 1012 that is clocked by the rising edge of the bit rate clock CLK. The second path includes a delay register 1004 that offsets the second data stream by a half cycle of the clock CLK with respect to the first stream. The offset data stream is fed as a second input to the register 1012. A second stage register 1016 couples to the first register 1012 and clocks-in a pair of alternating data bits from the first register in response to every falling edge of the clock CLK. Each falling edge of the clock also loads a previously stored pair of bits onto a load path 1018 for routing to one of a plurality of load registers 1020a-1020d, depending on the validity of a load control signal LD[0]-LD[3]. The load registers for each DQ circuit 1002 are coupled to the load path 1018 in parallel and together form a serial-parallel output circuit 1024. The output circuits are labeled 1024a-1024n to correspond to the respective DQ circuits 1002a-1002n.

Further referring to FIG. 10, the load control signals LD[0]-LD[3] are generated by a deserializer control circuit 1022 in a similar manner to how the enable signals EN[0]-EN[3] are generated by the serializer control circuitry 804. A delay line of registers 1024a-1024d are employed and separated from each other by respective multiplexers 1026a-

1026*d*. Each multiplexer includes a control input to receive a load signal LD, with the registers having a clock input tied to the bit rate clock CLK. Each register 1024 generates an output that is fed to a subsequent register and tapped to provide a specific load "control" signal to activate a corresponding load register in each DQ circuit 1002.

With continued reference to FIG. 10, the DQ circuit load registers 1020*a*-1020*d* form a parallel output data are sequentially filled with respective pairs of data bits from the load path 1018 within a single load interval LDr that defines the deserialization rate (programmed to inversely match the serialization rate). In response to an LDr signal, a synchronized version of the LDr signal, LDr' is generated by synchronizing register 1030 and applying the signal to an I/O register 103 for simultaneous loading of all the bit pairs in parallel during the load interval, for further processing as parallel data.

Figure 11:
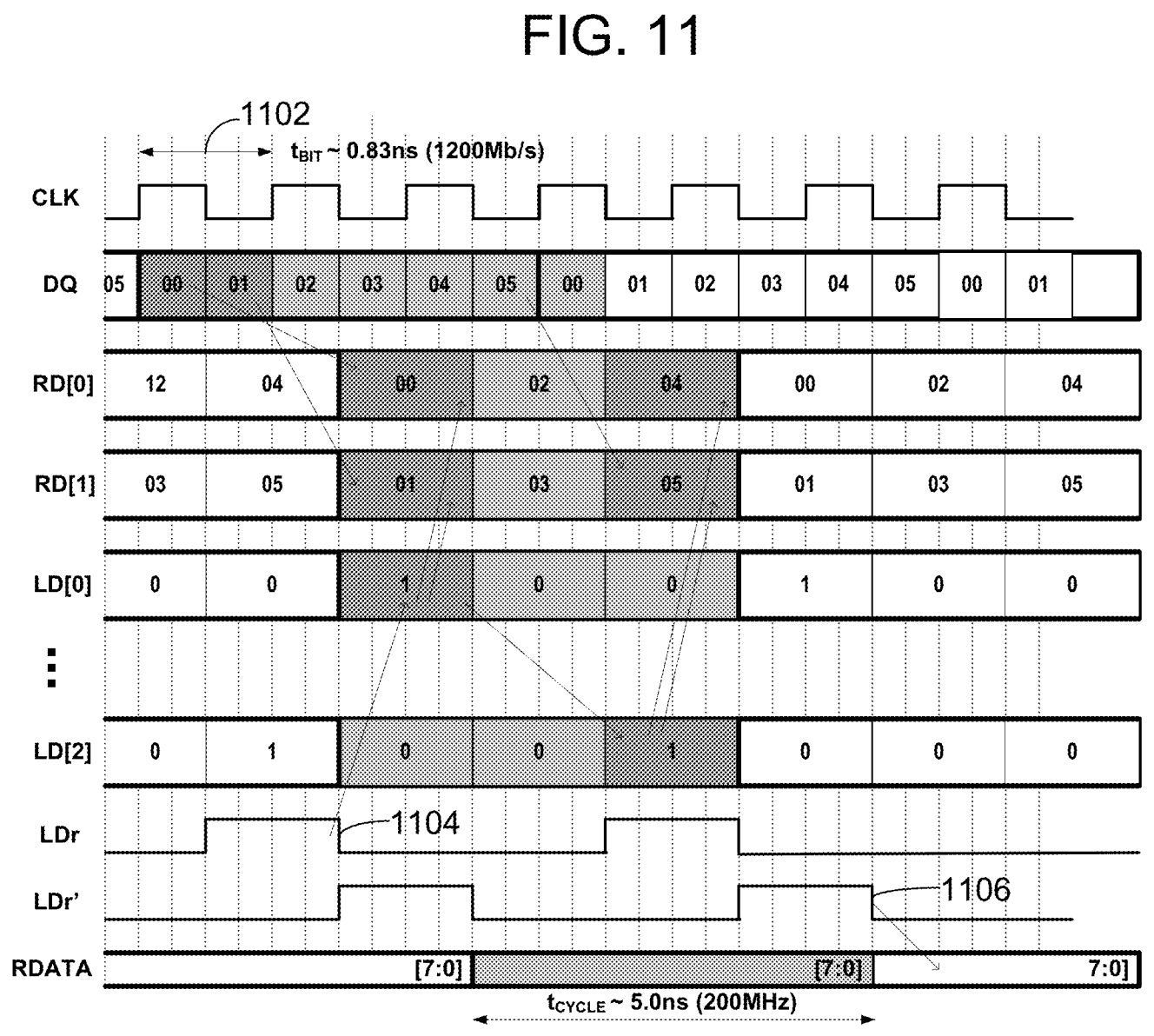

FIG. 11 provides a visual depiction of a data sequence of 6 bits progressing from a single DQ link through one of the DQ deserialization circuits 1002 employed in the deserialization circuitry 1000 of FIG. 10. With the bit rate clock waveform CLK positioned at the top of FIG. 11 as a reference, a first pair of bits "00" and "01" are received at the de-interleaving circuit 1006 during a first clock cycle interval, at 1102. A falling edge of the load signal LDr at 1104, causes the control circuit 1022 to generate a first load control signal LD[0] for loading the bits 00 and 01 into the first load register 1020*a*. Bits "02" and "03" are loaded into register 1020*b* a clock cycle later in response to load control signal LD[1], with bits "04" and "05" following in response to signal LD[2] in sequence. Upon the falling edge of the parallel load signal LDr', at 1106, all 6 data bits are transferred in parallel from their respective registers to the column I/O register 1032.

As noted above, the serializer and deserializer circuits 800 and 1000 provide the flexibility for programmatically selecting one from a plurality of serialization rates, such as 2:1, 4:1, 6:1, and 8:1 by straightforwardly programming the available data paths and load signal interval. This, in turn, provides a way to flexibly design a memory interface to suit a given application without being constrained to solely doubling and/or halving pin counts and associated link rates.

Figure 12:
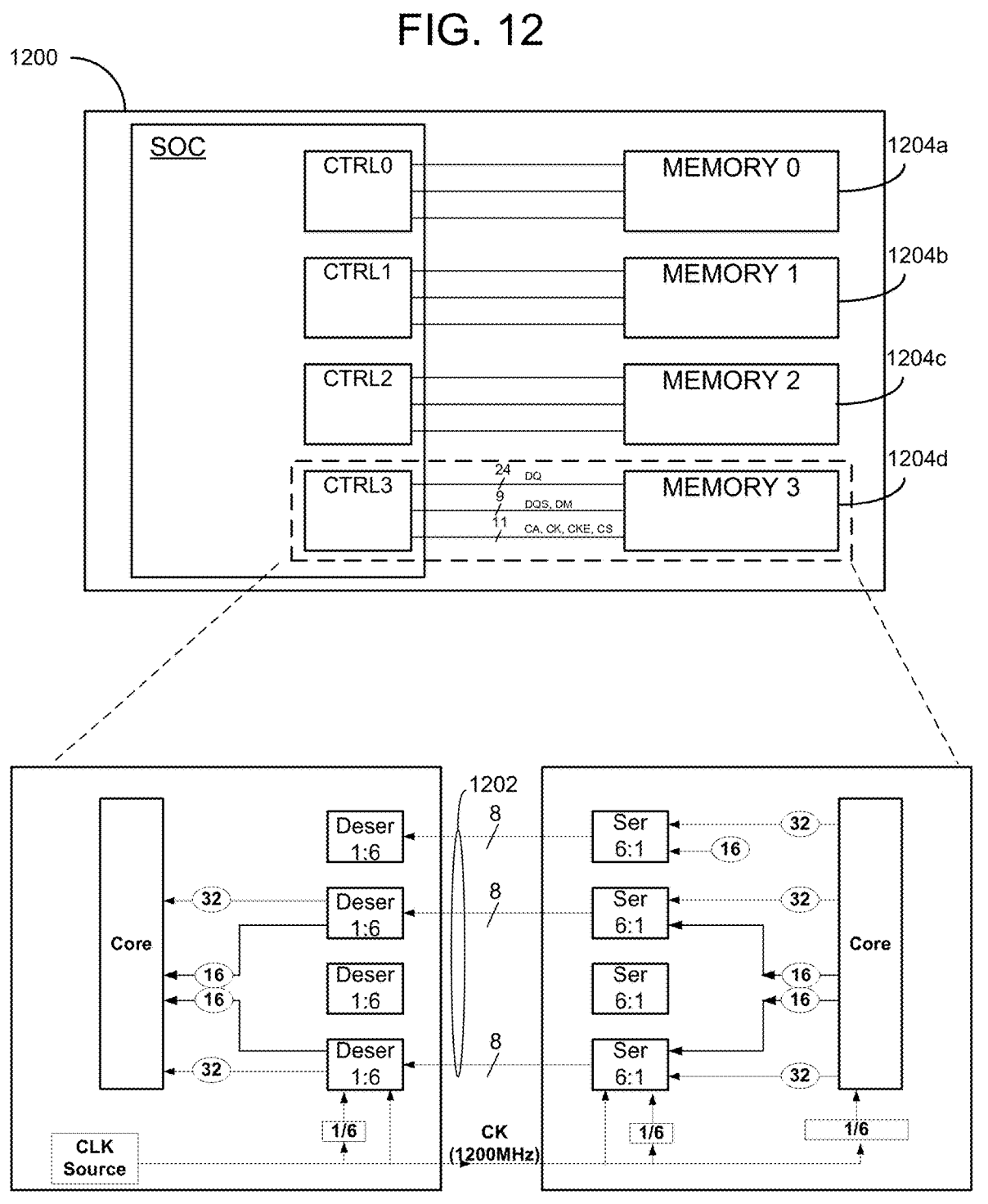

FIG. 12 illustrates how the embodiments described herein have a beneficial impact on memory system design. An SIP/MCP assembly 1200 is shown, with a plurality of memory devices 1202*a*-1202*d* coupled to corresponding memory controller circuits 1204*a*-1204*d* formed on, for example, an SOC integrated circuit device 1206. For exemplary purposes, assuming a maximum of 300 allowable pins for packaging purposes, and a desired total memory bandwidth of approximately 12.8 GB/s, less than half of the pins are available for data transfer (DQ) purposes employing memory technology such as, for example, mobile DDRN and its variants. With the interface embodiment of FIG. 6A as an example to illustrate context at a system level, a set of 24 data links 1208 (providing a non-power-of-2 ratio between the column I/O count and data links) corresponds to a number of data, or DQ paths provided by a single memory device 1202. For an SIP or MCP application that employs multiple memory devices, minimizing the number of links is important due to typical constraints on the number of balls available for standard packaging implementations. However, as explained previously, due to signal integrity constraints for typical low-cost packaging solutions, minimizing the number of data links to the lowest possible number (and correspondingly increasing the data rate to maintain bandwidth) isn't always possible.

Thus, by employing one or more of the solutions described herein, a flexible balance between the number of links and the data rates at which those links operate may be achieved without resorting to extreme design measures in terms of pin counts and/or link rates.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '$\overline{signalname}$') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An integrated circuit (IC) to control a dynamic random access memory (DRAM) device, the IC comprising:
   command interface circuitry to transmit a command to the DRAM device, the command to specify a memory access;
   interface circuitry to receive from the DRAM device via a first number of input/output (I/O) pins, data associated with the memory access; and
   deserialization circuitry to receive in parallel a first portion of the data from the interface circuitry, the deserialization circuitry to provide in parallel a second portion of the data to a second number of internal data paths, wherein a quotient of the second number divided by the first number is a non-power-of-two value.

2. The IC of claim 1, wherein:
   one of the first number and the second number is a power-of-two value, and an other one of the first number and the second number is a non-power-of-two value.

3. The IC of claim 1, wherein:
   the second portion of the data is temporally offset with respect to the first portion of the data.

4. The IC of claim 1, wherein:
   the second portion of the data is received by the interface circuitry before the first portion of the data.

5. The IC of claim 1, wherein:
   the command comprises a read command;
   wherein the first portion of the data comprises a first group of read data bits received in response to a sampling clock signal; and
   wherein the second portion of the data comprises a second group of read data bits received in response to a second clock signal.

6. The IC of claim 1, wherein the deserializer comprises:
   load circuitry responsive to a load signal to sequentially receive the first portion of the data from the interface circuitry along a subset of a group of serial input data paths; and
   control circuitry to enable transfer of the second portion of the data from the load circuitry to logic core circuitry along the second number of internal data paths.

7. The IC of claim 6, wherein the subset of the group of serial input data paths corresponds to a programmable number of desired input paths from the group of serial input data paths.

8. The IC of claim 1, comprising one of a host IC chip, a discreet IC memory controller chip and a system-in-package (SiP).

9. An integrated circuit (IC) chip, comprising
   memory control circuitry to control a dynamic random access memory (DRAM) device, the memory control circuitry comprising:
   command interface circuitry to transmit a read command to the DRAM device, the read command to specify an access of read data from the DRAM device;
   data receiver circuitry to couple to a first number of data links, the receiver circuitry to receive the read data from the DRAM device via a first number of input/output (I/O) pins; and
   deserialization circuitry to receive in parallel a first portion of the read data from the data receiver circuitry, the deserialization circuitry to provide in parallel a second portion of the read data to a second number of internal data paths, wherein a quotient of the second number divided by the first number is a non-power-of-two value.

10. The IC chip of claim 9, wherein:
   one of the first number and the second number is a power-of-two value, and an other of the first number and the second number is a non-power-of-two value.

11. The IC of claim 9, wherein:
   the second portion of the data is temporally offset with respect to the first portion of the data.

12. The IC of claim 9, wherein:
   the second portion of the data is received by the interface circuitry before the first portion of the data.

13. The IC of claim 9, wherein:
   the command comprises a read command; and
   wherein the first portion of the data comprises a first group of read data bits received in response to a sampling clock signal; and
   wherein the second portion of the data comprises a second group of read data bits received in response to a second clock signal.

14. The IC chip of claim 9, wherein the deserializer comprises:
   load circuitry responsive to a load signal to sequentially receive the first portion of the data from the interface circuitry along a subset of a group of serial input data paths; and
   control circuitry to enable transfer of the second portion of the data from the load circuitry to logic core circuitry along the second number of internal data paths.

15. The IC chip of claim 14, wherein the subset of the group of serial input data paths corresponds to a programmable number of desired input paths from the group of serial input data paths.

16. A method of operation in an integrated circuit (IC), comprising:
   controlling a dynamic random access memory (DRAM) device, the controlling comprising:
   transmitting a command to the DRAM device, with command interface circuitry, the command to specify a memory access;
   receiving from the DRAM device, with a first number of input/output (I/O) pins, data associated with the memory access;
   receiving in parallel, with deserialization circuitry, a first portion of the data from the interface circuitry; and providing in parallel, with the deserialization circuitry, a second portion of the data to a second number of internal data paths, wherein a quotient of the second number divided by the first number is a non-power-of-two value.

17. The method of claim 16, wherein:

one of the first number and the second number is a power-of-two value, and an other of the first number and the second number is a non-power-of-two value.

18. The method of claim 16, further comprising:

temporally offsetting the second portion of the data with respect to the first portion of the data.

19. The method of claim 16, further comprising:

receiving the second portion of the data by the interface circuitry before the first portion of the data.

20. The method of claim 16, wherein:

the command comprises a read command;

wherein the receiving in parallel, with deserialization circuitry, of the first portion of the data from the interface circuitry comprises receiving a first group of read data bits in response to receiving a sampling clock signal; and wherein the providing in parallel, with the deserialization circuitry, of the second portion of the data to the second number of internal data paths comprises providing a second group of read data bits in response to receiving a second clock signal.

* * * * *